United States Patent
Jaso (10) Patent No.: US 8,139,674 B2
(45) Date of Patent: Mar. 20, 2012

(54) SPACEFLIGHT HIGH DATA RATE RADIATION HARD KA-BAND MODULATOR

(75) Inventor: Jeffrey M. Jaso, Olney, MD (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 914 days.

(21) Appl. No.: 12/173,243

(22) Filed: Jul. 15, 2008

(65) Prior Publication Data

US 2010/0014610 A1    Jan. 21, 2010

(51) Int. Cl.
*H04L 27/00* (2006.01)
(52) U.S. Cl. ........................................ 375/295
(58) Field of Classification Search .................. 375/295
See application file for complete search history.

(56) References Cited

U.S. PATENT DOCUMENTS

2003/0157888 A1* 8/2003 Inoue .............................. 455/41

OTHER PUBLICATIONS

Xinping Huang, Zhiwen Zhu, Mario Caron, A 30GHz 155MBIT/S Self-Calibrating Direct Transmitter, IEEE, Sep. 2006.*
D.Drolet A. Panter, C. J. Verver, K. Kautio, Y,-L. Lai, Ka-band Direct Transmitter Modules for Baseband Pre-compensation, Oct. 4-6, 2005.*

* cited by examiner

*Primary Examiner* — David C. Payne
*Assistant Examiner* — Tanmay Shah (57) ABSTRACT

A Ka-band transmitter. The transmitter is in a self-contained module that contains a radio frequency (RF) channel. A phase lock oscillator drives an RF signal path in the RF channel at a fundamental frequency. In-phase data (I-data) and Quadrature data (Q-data) difference signals are converted to single ended signals and filtered in a pair of low pass filters and passed as inputs to a Quadriphase Shift Keying (QPSK) vector modulator in the RF signal path, e.g., an in-line even-harmonic modulator. The output of the QPSK vector modulator, is a Ka-band signal that is passed to a driver which may drive a load, e.g., an antenna.

16 Claims, 11 Drawing Sheets

SPACEFLIGHT HIGH DATA RATE RADIATION HARD KA-BAND MODULATOR

ORIGIN OF THE INVENTION

The invention described herein was made by an employee of the United States Government, and may be manufactured and used by or for the Government for governmental purposes without the payment of any royalties thereon or therefor.

BACKGROUND OF THE INVENTION

1. Field of the Invention

The present invention is generally related to extra-planetary communications and more particularly to a radiation hardened modulator for high performance space-based near-Earth communications.

2. Background Description

The National Aeronautics and Space Administration (NASA) Goddard Space Flight Center (NASA/GSFC) Solar Dynamics Observatory (SDO) mission requires a three hundred symbols per second (300 Msps) downlink data rate. NASA has mandated that all future "near Earth" (i.e., any spacecraft within one million kilometers of Earth) missions requiring more than 10 Megahertz (10 MHz) of downlink data bandwidth must operate in 25.5 to 27.0 Gigahertz (25.5-27.0 GHz). This falls in what is known as the Ka-band, ~18-40 GHz.

There is no commercial transmitter that meets the SDO requirements. While high data-rate transmitters exist at what are known as the X-band (~8 GHz) and Ku-band (~15 GHz), no commercial spaceflight qualified transmitter had been able to transmit in the Ka-band.

Thus, there is a need for high data-rate transmitters capable of operating in the Ka-band.

SUMMARY OF THE INVENTION

It is an aspect of the invention to facilitate space-based near-Earth mission communications and data collection;

It is another aspect of the invention to transmit data in the Ka-band;

It is yet another aspect of the invention to transmit data up to 800 Msps.

The present invention relates to a Ka-band modulator. The modulator includes a phase-locked oscillator (PLO that provides a local oscillator at ¼ the output center frequency; a $4^{th}$ harmonic QPSK vector modulator; interface circuitry to receive two LVDS data streams (I channel and Q channel), convert the data to single-ended signals, and spectrally filter. The preferred QPSK vector modulator produces a Ka-band signal that is passed to a driver which may drive a load, e.g., an antenna, with resulting IF (intermediate frequency) signals. The design is contained in an integrated back-to-back cavity hybrid assembly.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
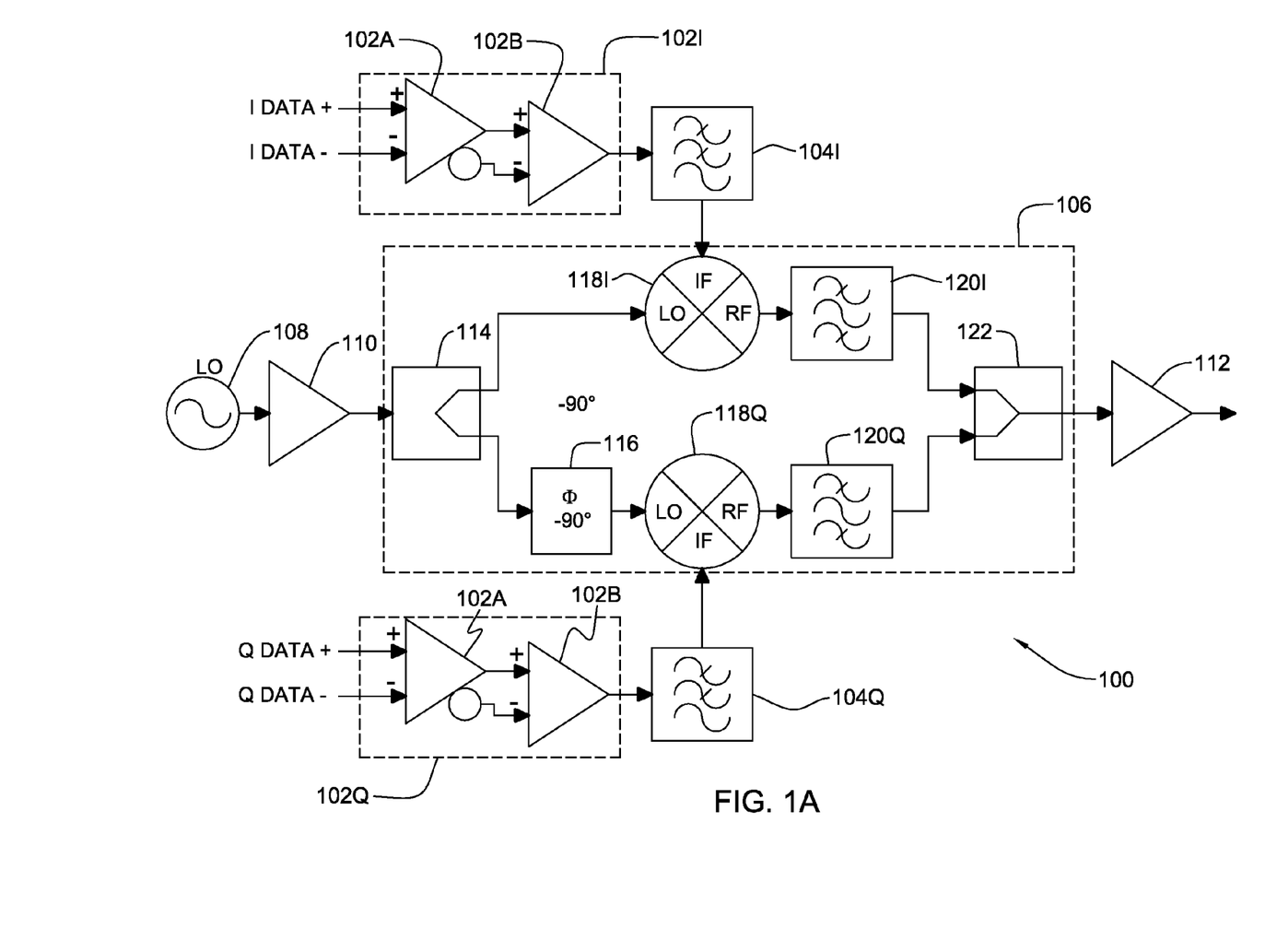
FIGS. 1A-B show a Ka-band transmitter schematic example 100, radiation hardened for providing high data rates, e.g., in a space environment, according to a preferred embodiment of the present invention.
Figure 1B:
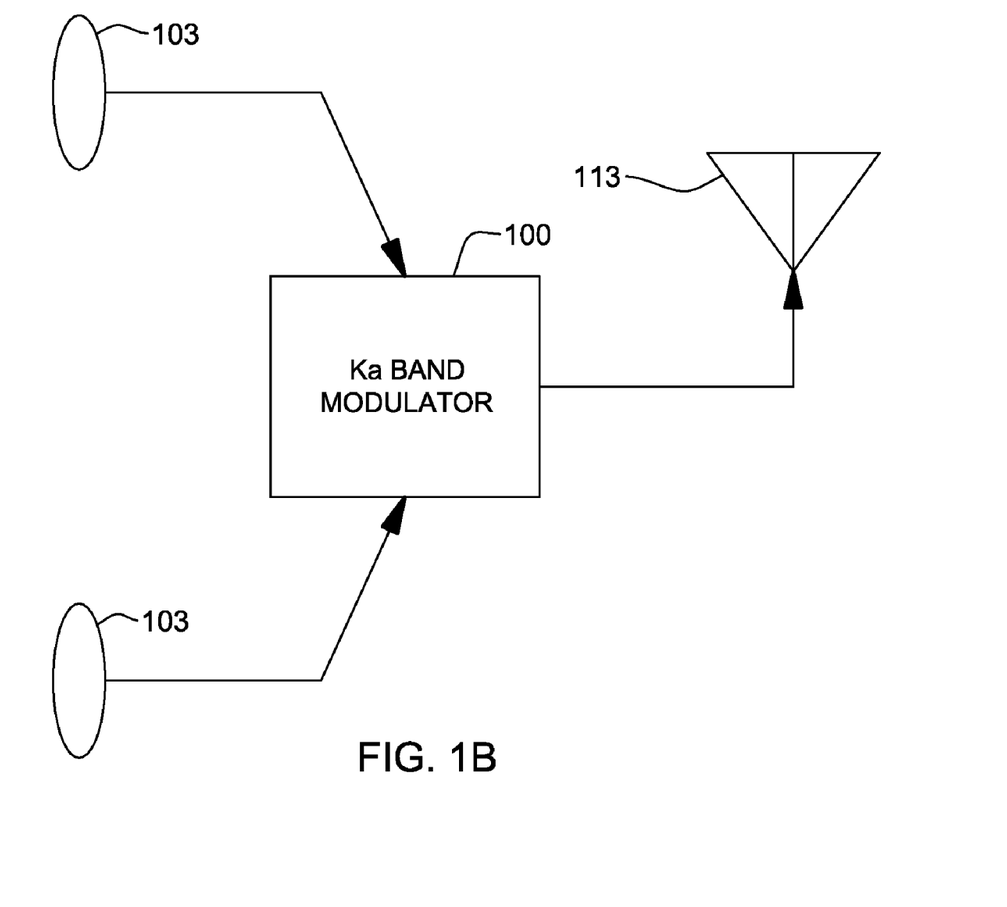

Turning now to the drawings and more particularly FIGS. 1A-B show a Ka-band transmitter schematic example 100, radiation hardened for providing high data rates, e.g., in a space environment, according to a preferred embodiment of the present invention. Preferably, the Ka-band modulator 100 includes a high bandwidth Quadriphase Shift Keying (QPSK) vector modulator and radiation-hardened high-rate driver that receives In-phase (I) and Quadrature (Q) channel data. As described herein, a preferred Ka-band modulator includes a Ka-band modulator, such as the schematic example 100, integrally constructed in a radio frequency (RF) signal path and further self-contained in a three dimensional (3D) RF module, designed and constructed such that RF paths satisfy modulator operating conditions. Moreover, a preferred Ka-band modulator 100 has application for example, in the National Aeronautics and Space Administration (NASA) Goddard Space Flight Center (GSFC) Solar Dynamics Observatory (SDO) mission.

Schematically, In-phase and Quadrature data (I-data and Q-data), e.g., from a Command and Data Handling system 103, are received through signal segments 102I and 102Q to develop single ended signals. The single-ended I-data and Q-data signals are filtered in low pass or spectral filters 104I and 104Q to provide I and Q inputs to QPSK modulator 106. Preferably, the QPSK modulator 106 is an in-line even-harmonic modulator. A phase lock oscillator 108 provides a fundamental frequency (LO), e.g., 6.625 Gigahertz (6.625 GHz), to a distributed driver amplifier 110, e.g., a Triquint TGA4832. The distributed amplifier 110 supplies the amplified fundamental frequency to the QPSK modulator 106. The QPSK modulator 106 generates the Ka-band signal. A driver 112 amplifies and drives the Ka-band signal externally.

In particular, a preferred Ka-band modulator 100 has a center frequency that is scalable from 25.5-28 GHz over an operational temperature range of −10° C.-+50° C. This is achieved based on a LO that has a one quarter (¼) output center frequency with the Ka-band center frequency at the 4th even harmonic. The modulator 100 employs QPSK modulation with the I and Q inputs or an offset QPSK (OQPSK) modulator with staggered I and Q inputs to accommodate maximum per channel data rates of tip to 400 Mega-bits per second (400 Mbps) for a maximum composite symbol rate of 800 Megabits per second (800 Mbps) with an error vector magnitude less than ten percent (<10%). The modulator 100 includes spectral shaping filters 104I and 104Q that are arbitrarily tunable to all modulator data rates to meet National Telecommunications and Information Administration (NTIA) requirements. Moreover, a preferred Ka-band modulator 100 is radiation hardened (Rad hard) for a total dose in excess of 100 krad Si, tolerating and mitigating infrequent Single Event Upsets (SEUs) of short duration at SEU Linear Energy Transfer thresholds (LETs) up to 37 MeV-cm2/mg. Total dose radiation hardness may be provided by carefully selecting parts; and SEU tolerance may be provided by a combination of part selection and circuit design. Further, part selection may encompass either choosing parts that are fabricated with a special radiation hardened process, or choosing parts that have been tested or analyzed to withstand radiation upsets.

The fundamental frequency (LO) enters the QPSK modulator 106 and splits into two paths in a splitter/combiner 114, which is constructed for geometrical symmetry to guarantee amplitude and phase balance for the two emerging paths. Preferably, the splitter/combiner 114 is a two-section Wilkinson with embedded resistors to cover 2-octave bandwidth, providing isolation of ~12 dB at LO and ~17 dB at 4× LO. A simple λ/4 delay line 116 achieves quadrature shifting the signal at the fundamental frequency (−90°), to provide a quadrature-shifted signal. A set of 6 dB embedded attenuators (not shown in this example) improve mixer-to-mixer isolation. The fundamental frequency and the quadrature-shifted frequency are passed to a pair of even-harmonic mixers 118I and 118Q, preferably, antiparallel diode mixers. The even-harmonic mixers 118I and 118Q multiply 4× LO by the IF signals.

Each even-harmonic mixer 118I and 118Q provides a corresponding unfiltered RF in the in-phase and quadrature paths. A pair of band-pass filters 120I and 120Q pass the respective mixer outputs (4×LO±IF, hereafter referred to as RF), e.g., at $f_c$=26.5 GHz; the 3 dB bandwidth is 1 GHz at 2 dB insertion loss (IL). Preferably, each band-pass filter 120I, 120Q is a 3-section hairpin in microstrip with resonators folded into a U-shape to decrease structure width. So, for example, with a 26.5 GHz fourth harmonic, the band pass filters 120I and 120Q pass the RF and suppress the subharmonics (LO, 2×LO, 3×LO) and other harmonics (2×RF, 3×RF) more than 35 dB. An RF splitter/combiner 122 combines the filtered RF in the in-phase and quadrature paths to generate the modulated Ka-band signal, which passes to the driver 112, e.g. driving an antenna 113. The driver 112 also allows switching between primary and redundant data streams in high reliability applications.

Figure 2A:
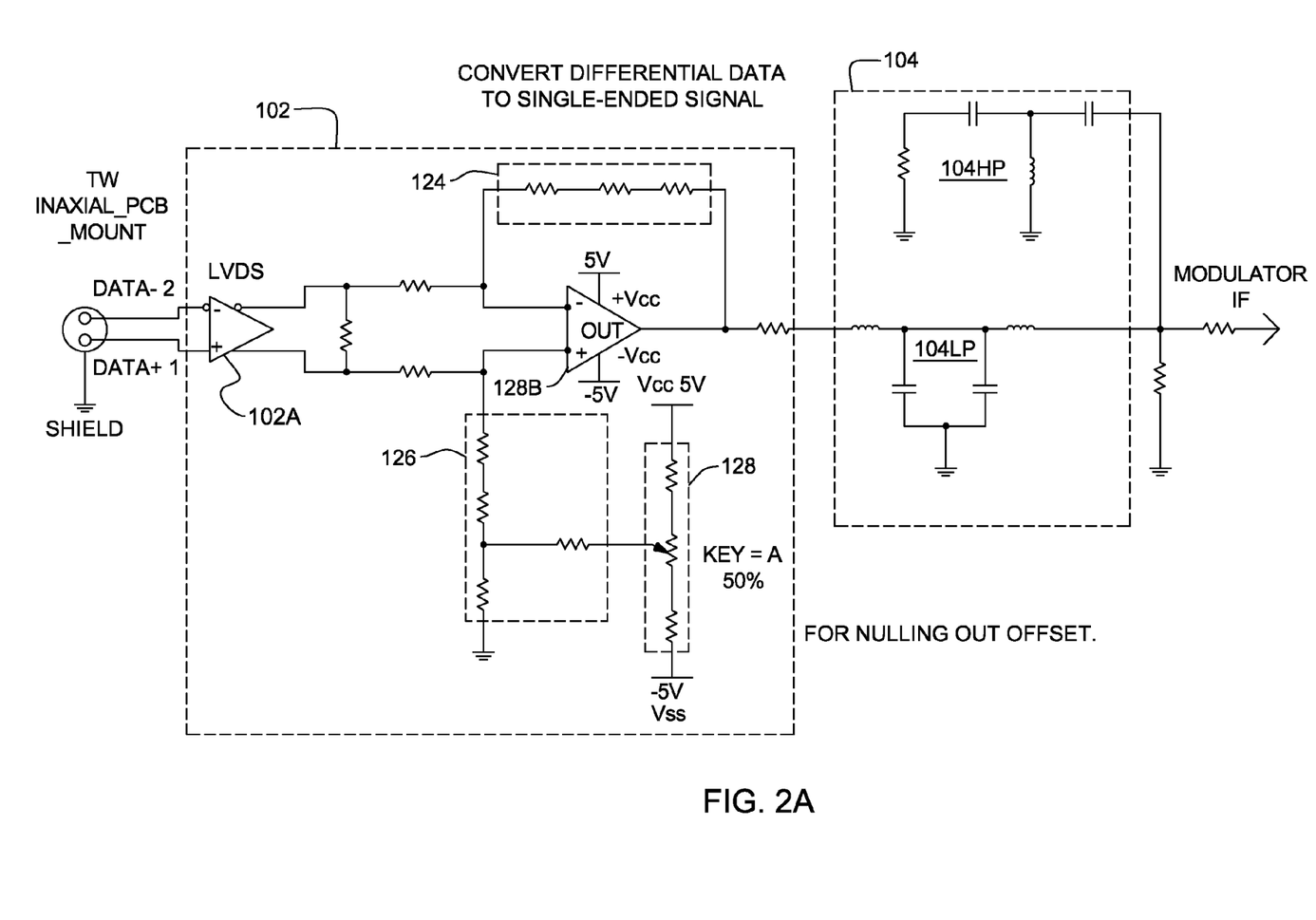
FIGS. 2A-C show a schematic example of a signal segment and spectral filter in more detail and spectral filter signal response.
Figure 2B:
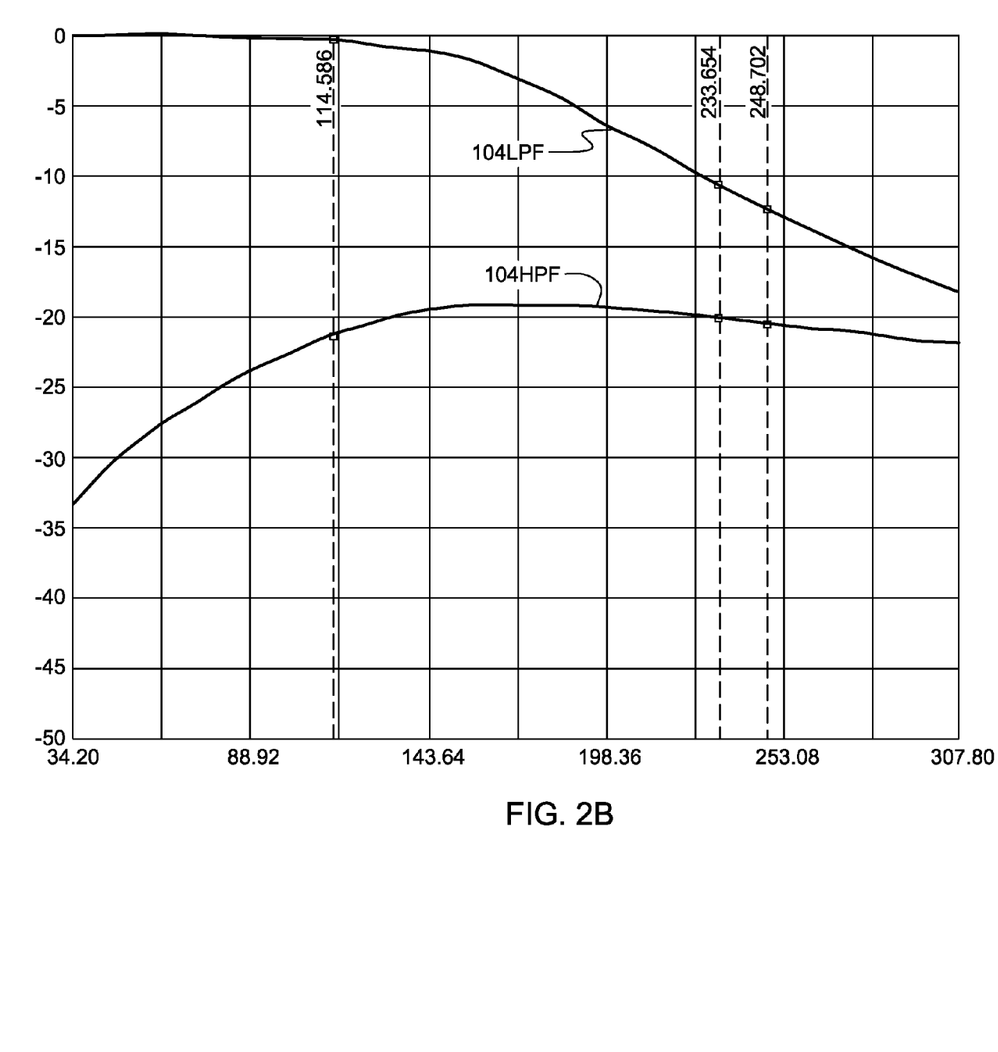
Figure 2C:
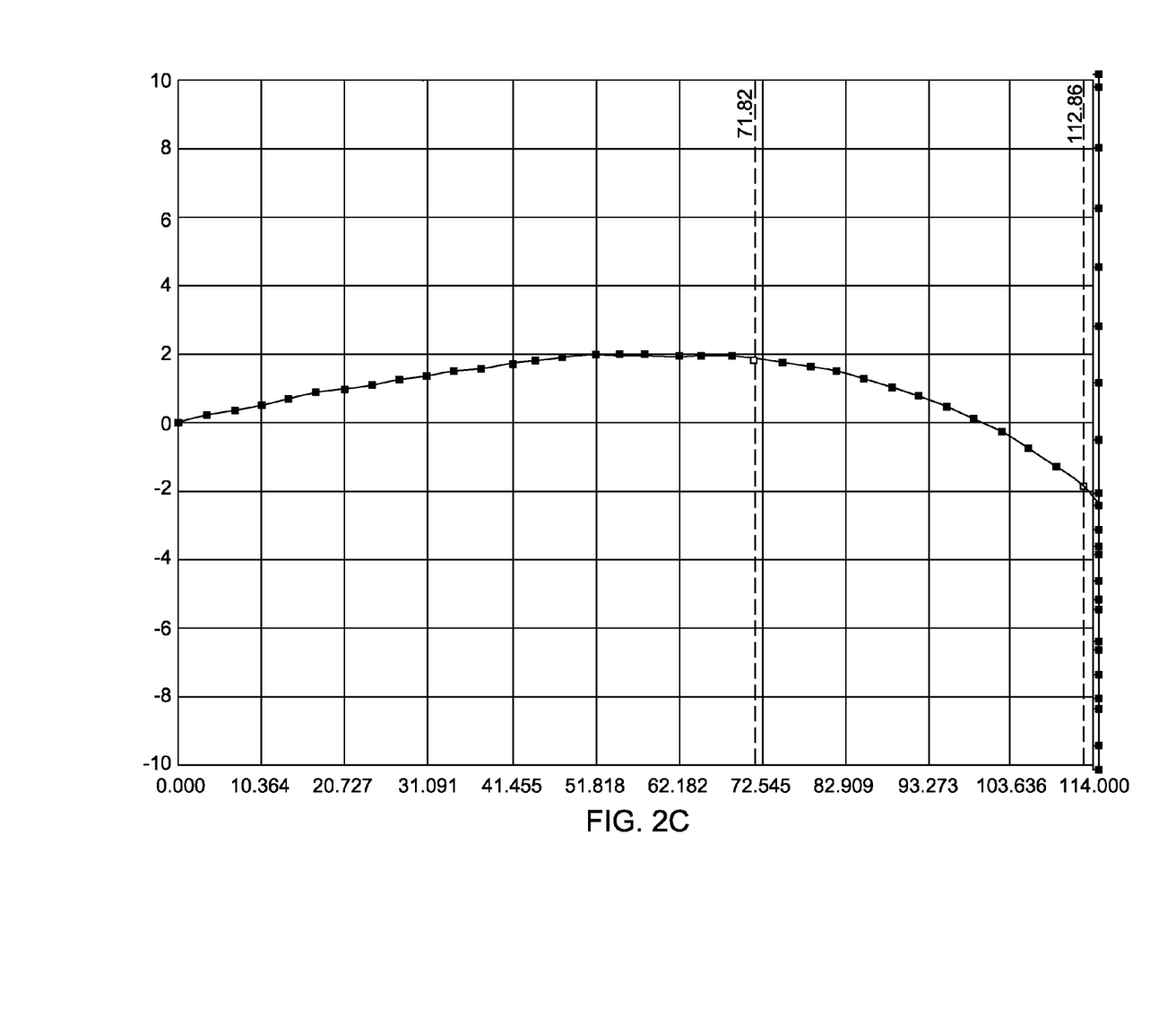

FIGS. 2A-C show a schematic example of a signal segment 102 (e.g., typical of signal segments 102I and 102Q) and spectral filter 104 in more detail and spectral filter 104 frequency response. Passive component (R, L, C) values are chosen for the particular application, including desired gain and operating frequency, as is well known in the art. Preferably, the signal segment 102 input includes a line receiver 102A providing a complementary pair of outputs to an operational amplifier 102B. In particular, the line receiver 102A may be a Low Voltage Differential Signaling (LVDS) receiver and, preferably, part of a single Rad hard Integrated Circuit (IC). A flight version of the Aeroflex UT54LVDM228 Quad 2×2 400 Mbps Crosspoint Switch from Aeroflex Incorporated is an example of a suitable Rad-hard LVDS ICs. The LVDS receiver 102A sets the maximum modulator data rate, in this example 400 Mbps per channel. In particular, the LVDS receiver 102A receives and squares up the data and passes it to a differential operational amplifier 102B, which converts, for example, a 100 Ohm (100Ω) differential signal to a 50Ω signal-ended signal.

The differential operational amplifier 102B includes adjustable amplifier feedback 124 that allows I/Q amplitude adjustment to reduce error vector amplitude components. Amplifier gain is selected by values selected for various signal segment 102 resistors, including especially feedback resistor 124. Since static or DC offsets 126 can degrade carrier suppression, a trimming network 128 allows for nulling offsets and compensating for antiparallel diode mismatches. The operational amplifier 102 converts differential signal to single-ended signal and provides a single I or Q output to spectral filter 104, e.g., 104I, 104Q, which forwards the filtered signal to the RF channel.

Preferably, the spectral filter 104 is a diplexor, which filters the IF to ensure compliance with the National Telecommunications and Information Administration (NTIA) spectral mask. In this example, the spectral filter 104 includes a series low pass filter 104LP and, optionally, a parallel or shunt connected high pass filter 104HP to reduce IF ringing which degrades EVM.

As can be seen from FIGS. 2B and C, which show examples of diplexer amplitude response and phase distortion to frequency at a 228 Msps data rate, this preferred diplexer configuration provides sufficient spectral shaping for spectral masking with minimum phase distortion. FIG. 2B shows an example of diplexer amplitude response over frequency for the low pass filter 104LP and high pass filter 104HP. The low pass filter 104LP blocks high frequency (HF) components (e.g., above 205 MHZ) and the high pass filter 104HP shunts (i.e., shorts to ground) any HF components (e.g., above 205 MHZ) reflected by the low pass filter 104LP. The highpass filter 104HP provides a 50Ω termination for high-frequency components rejected by the lowpass filter 104LP. The low pass filter 104LP has a cutoff set to approximately one and a half times (1.5×) the channel rate to eliminate/attenuate first side lobes. As can be seen from FIG. 2A, eliminating/attenuating the first side lobes has minimal impact on phase linearity. More aggressive filtering may be traded for EVM.

Figure 3A:
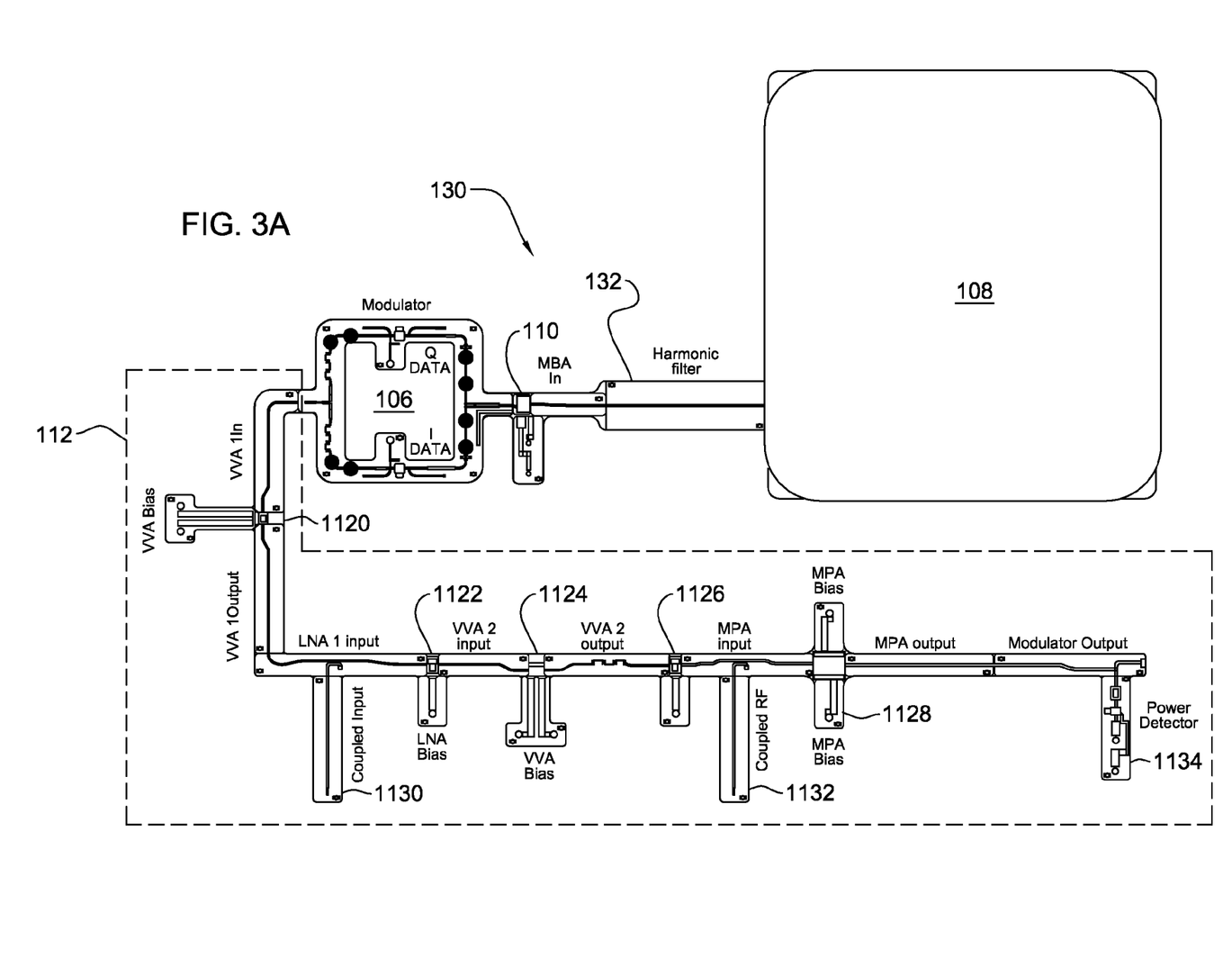
FIGS. 3A-C show an example of an RF signal path for an integrally constructed Ka-band modulator and tuning range for the QPSK even-harmonic modulator.
Figure 3B:
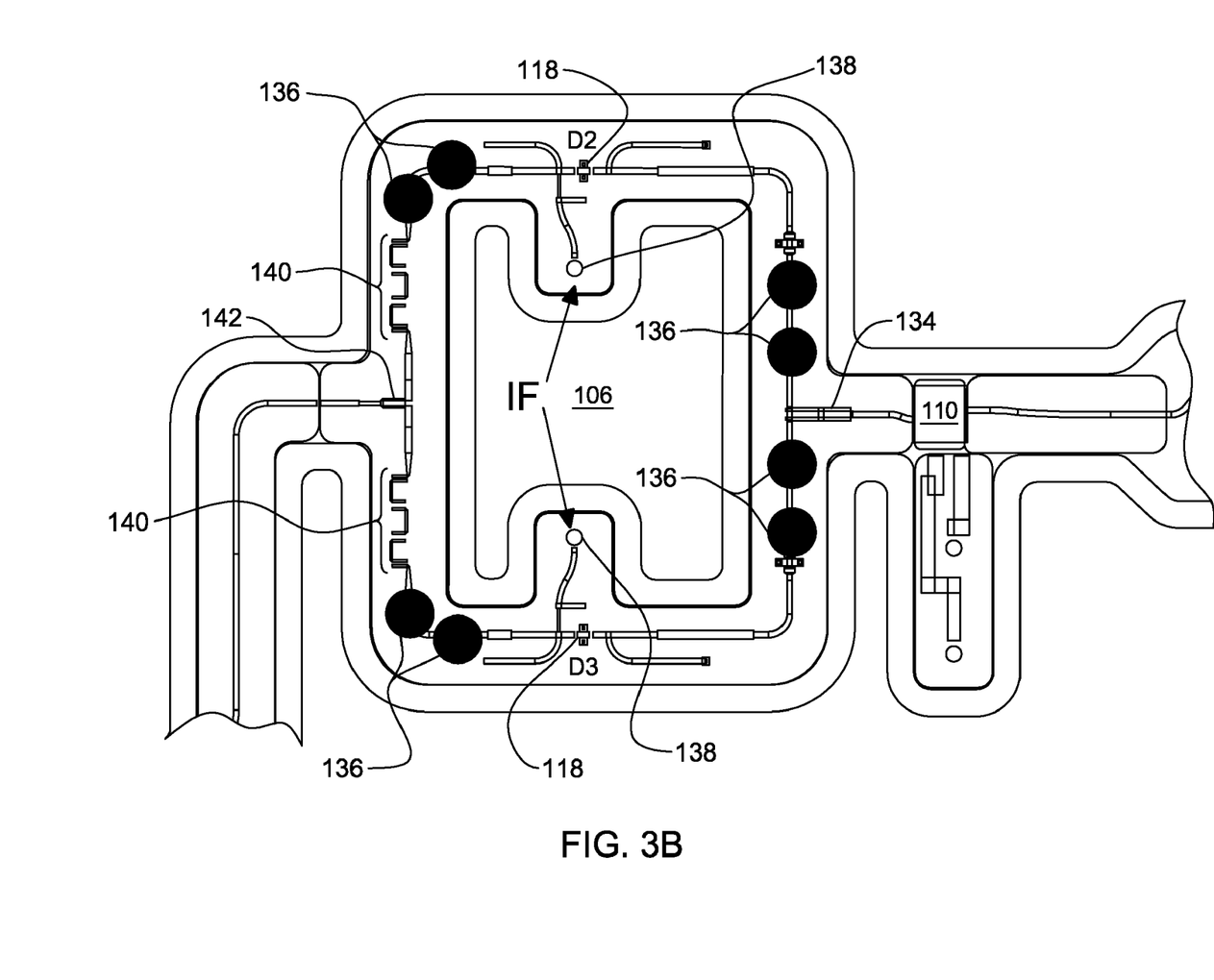

FIGS. 3A-B show an example of an RF signal path 130 for an integrally constructed Ka-band modulator, such as the schematic example 100 of FIG. 1A, and for the QPSK modulator 106, according to a preferred embodiment of the present invention. In this example, a harmonic filter 132 couples LO 108 to the distributed amplifier 110, which drives the QPSK modulator 106. The driver 112 is preferably a distributed amplifier, providing good output return loss over 2 octaves to ensure a 50 Ohm nominal source impedance for the $4^{th}$ even harmonic mixers within the QPSK modulator.

In particular, the preferred RF signal path 130 may include twenty one (21) 10 mil (0.25 mm) and one (1) 20 mil (0.51 mm) thick alumina printed circuit boards bonded to channel floor (not shown in this example). Preferably, the channels are 100 mil (2.54 mm) deep by 150 mils (3.81 mm) wide to provide fundamental (TE10) mode suppression of ~14.5 dB/100 mil. Further, stages are spaced to provide at least 65 dB stage-to-stage isolation.

In the expanded view of the QPSK modulator 106 of FIG. 3B, the distributed amplifier 110 drives a two-section Wilkinson 134 operating as the splitter/combiner 114. Tuning screws 136 along the RF path in the QPSK modulator 106 allow fine tuning phase adjustments. Intermediate Frequency (IF) I and Q components enter at internal taps 138 and pass through even-harmonic antiparallel diode mixers 118, essentially, a pair of diodes in a full wave rectifier configuration. Two 3-section hairpins 140 in microstrip are resonators folded into a U-shape to decrease structure width, form band pass filters 120I, 120Q. Preferably, each "U" is >2-4 times wider than resonator spacing to avoid resonator self-coupling. Increasing resonator impedance widens coupling section spacings, helping reliability. Tapped inputs and outputs increase spacing between U-shaped resonators. Further, phase cancellation at the hairpin ends where radiation is strongest reduces radiation. Microstrip filters require design iterations to achieve a desired result, but allow easy phase and amplitude tracking. The (4×LO±IF) mixer intermodulation products in the in-phase (I) and quadrature (Q) paths are passed by the band pass filters 120I, 120Q and combine in RF splitter/combiner 122 at 142 to generate the QPSK-modulated Ka-band signal, that passes to driver 112.

The Ka-band signal enters a first Voltage Variable Amplifier (VVA) 1120 in the driver 112 from the QPSK modulator 106. From the first VVA 1120, the pre-amplified Ka-band signal is amplified in a Low Noise Amplifier (LNA) 1122. The output of the LNA) 1122 passes through a 3-section hairpin filter 1124. From 3-section hairpin filter 1124 the signal passes to another VVA 1126. The signal passes from the VVA 1126 to a Medium Power Amplifier (MPA) 1128, which drives the modulator output. Test point inputs 1130, 1132 allow introduction of external signals for stimulating and testing the driver 112. A power detector 1134 provides a monitor for determining whether and when a signal is being transmitted.

Tunability for EVM optimization is accomplished in a number of ways. Amplitude balance can be adjusted by changing the differential operational amplifier 102B gain through trimming network 128. Tuning screws 136 can tune out up to 15 degrees to reduce/eliminate phase imbalances between I and Q paths. Thus, pairs of tuning screws 136 are spaced to cancel reflections by preserving a low-Voltage Standing Wave Ratio (VSWR).

Figure 3C:
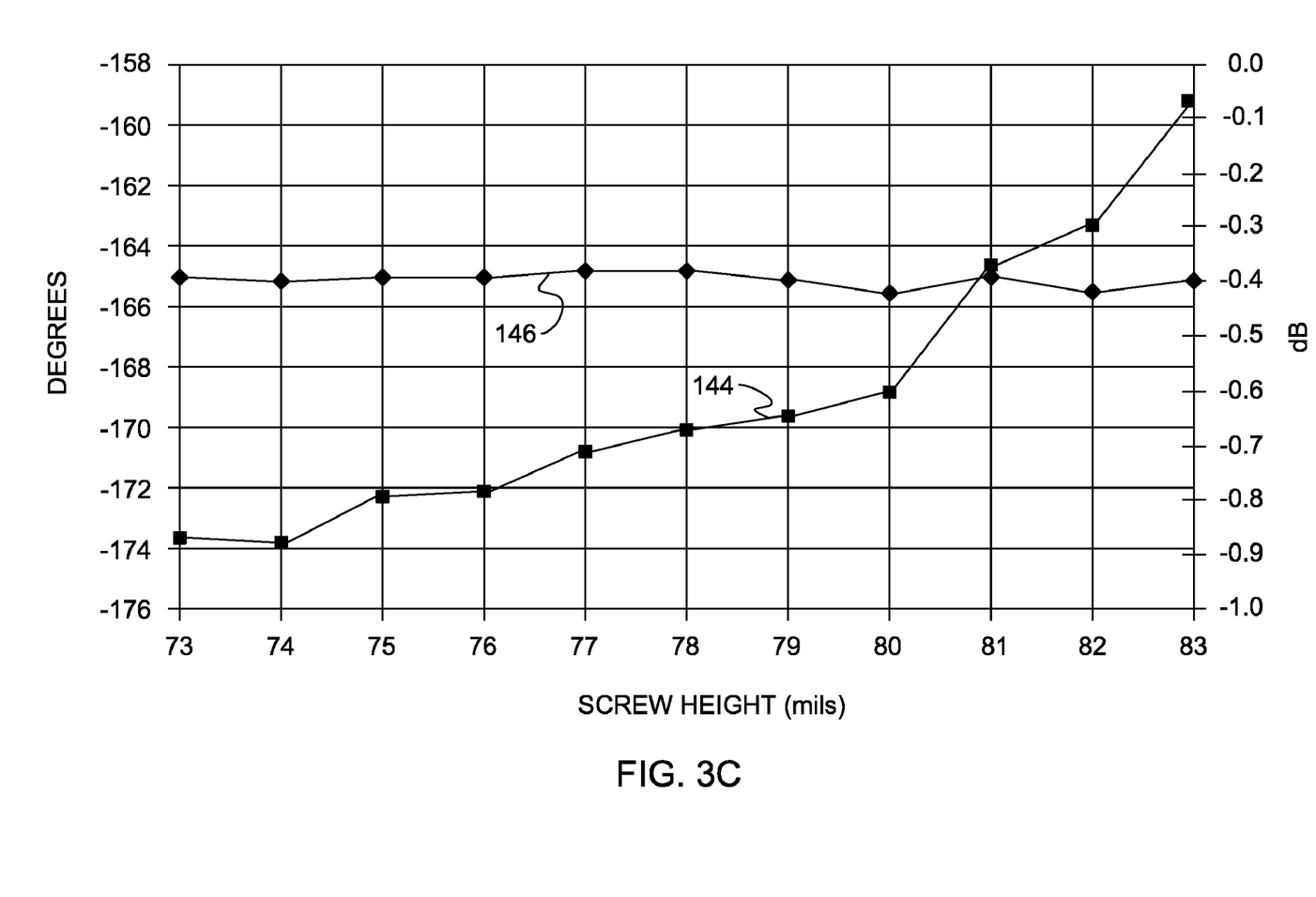

FIG. 3C shows an example of tuning range for each pair of tuning screws 136, comparing screw height in mils to phase 144 and to signal loss 146. Preferably, the screws 136 are spaced ¾λ apart to maintain good return loss (>20 dBs) and bonded to the module lid with conductive epoxy for avoid ground shift during thermal cycles. In this example, each pair of tuning screws 136 provides tip to 15 degrees of tuning range to compensate for shifts from manufacturing and parts variations.

Figure 4A:
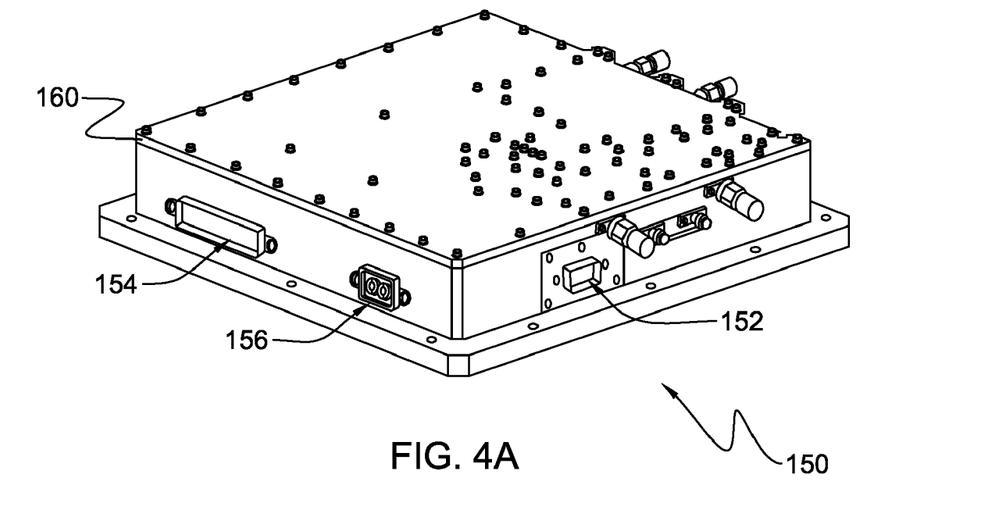
FIGS. 4A-C show an example of a preferred integrally constructed Ka-band modulator in a self-contained in a preferred 3D RF module, as an assembly, with the RF channel exposed and in an exploded view.
Figure 4B:
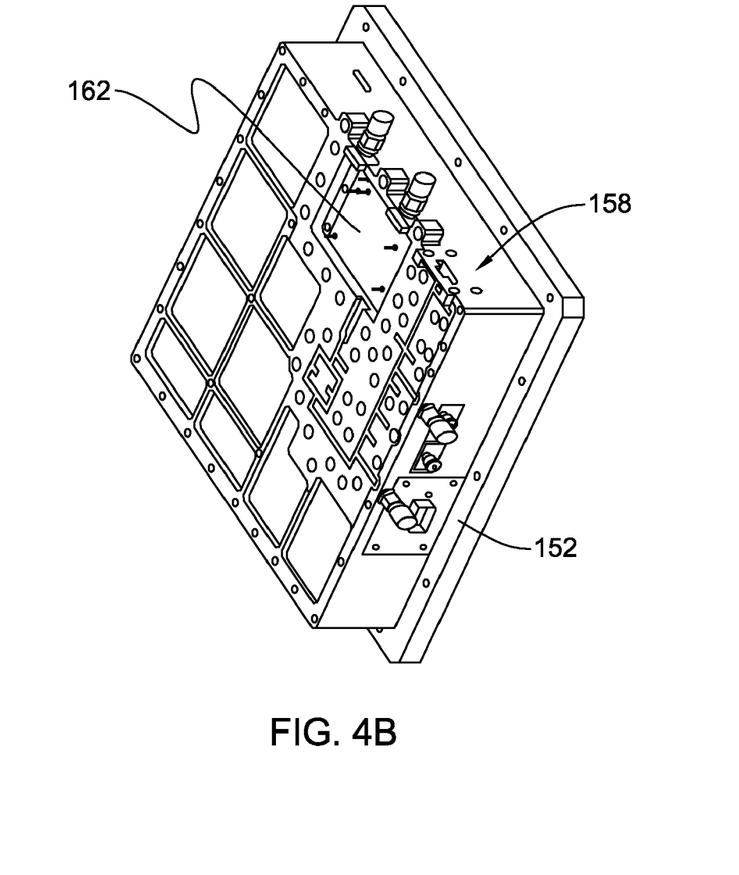
Figure 4C:
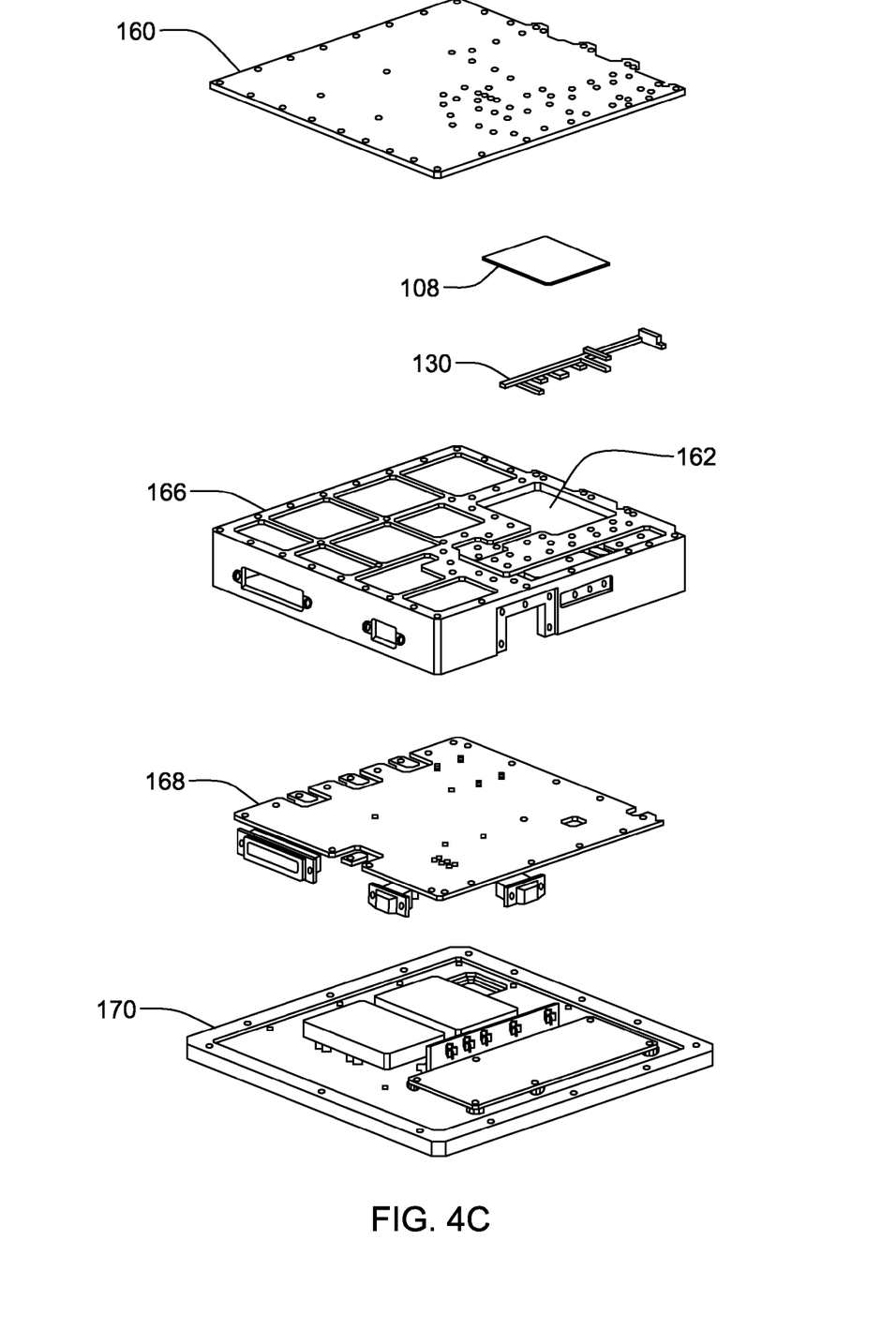

FIGS. 4A-C show an example of a preferred integrally constructed Ka-band modulator in a preferred 3D RF module 150, as an assembly, with the RF channel exposed and in an exploded view. The module 150 includes external ports for power 152, control/telemetry 154, data 156 and an RF data output 158. Removing the RF lid 160 exposes a cavity 162 for the LO 108 and the RF signal path 130 in channel 164, which is defined in a main enclosure 166. The alumina substrates that are bonded to a wall on one side of the main enclosure 166, i.e., the floor of the cavity 162, contain a portion of the chip-and-wire microwave circuitry 130. Monolithic Microwave Integrated Circuit (MMIC) subassemblies containing MMICs and single layer capacitors bonded to a copper molybdenum (CuMo) carrier are bonded into trenches between substrates with conductive epoxy. The main enclosure 166 includes a back-to-back cavity arrangement with an underside interface cavity (not shown) that encloses interface electronics on an interface printed circuit board 168. The interface board 168 includes the modulator interface and receives I and Q data streams through a twinaxial connector 156 with a customized launch to the PCB. Preferably, the interface board 168 is a multilayer polyimide board with power distribution and signal conditioning circuitry. Signals pass from the interface cavity to RF cavity through threaded capacitive feedthrus (not shown), e.g., feedthru capacitors. The feedthrus may be wire bonded onto RF boards and soldered with wire loops onto the interface board, and connect the interface electronics (not shown) with the RF signal path 130. Module power is supplied by a baseplate populated with a power supply 170. A blind mate connector (not shown) provides DC power to the interface board when the baseplate is mated to the main assembly.

Figure 5:
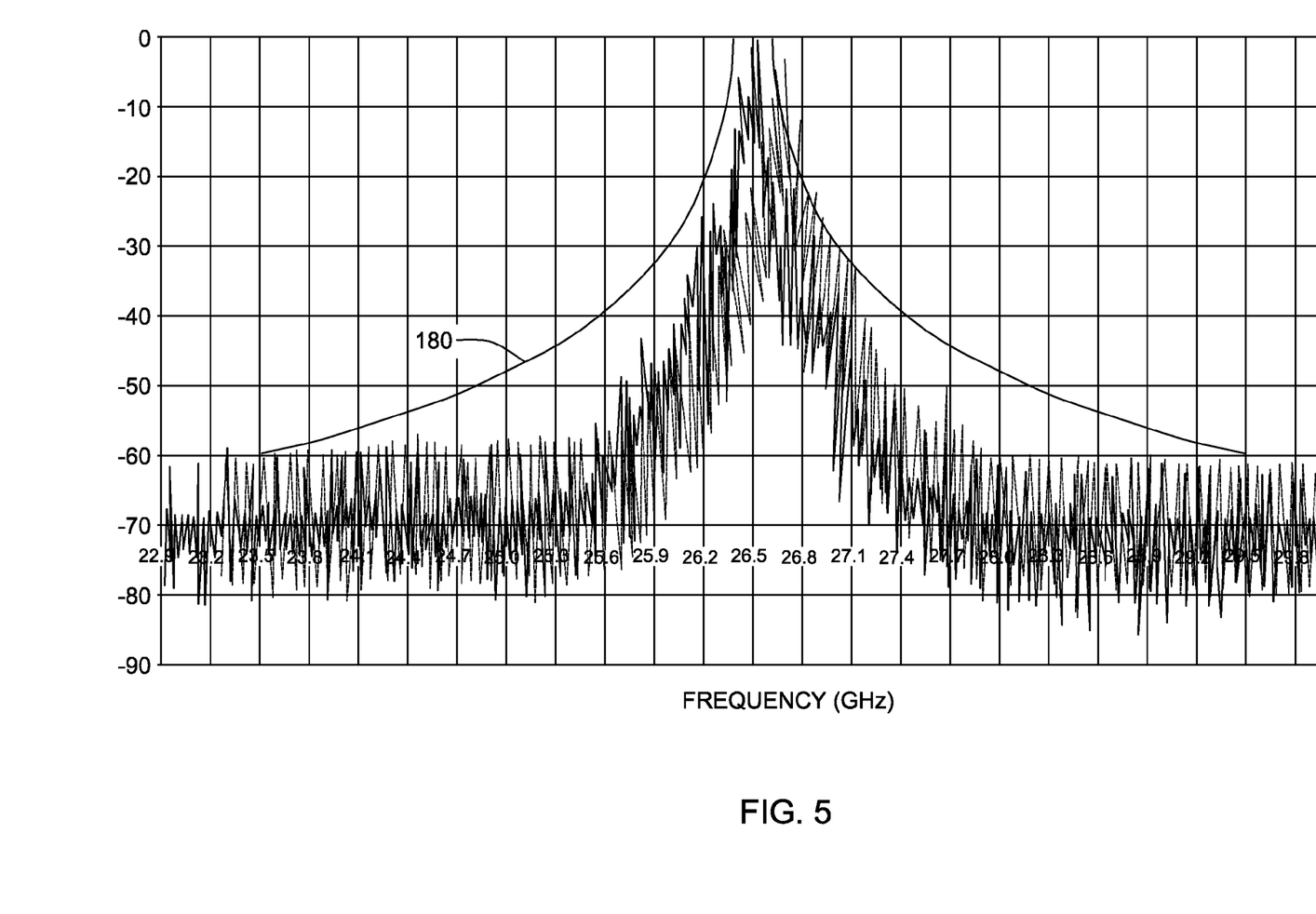
FIG. 5 shows an example of the SDO transmission (Tx) Spectrum Overlaid on the NTIA Mask 180 with the carrier frequency=26.5 GHz, and at a 300 Msps data rate.

FIG. 5 shows an example of the SDO transmission (Tx) Spectrum Overlaid on the NTIA Mask 180 with the carrier frequency=26.5 GHz, and at a 300 Msps data rate. Even though a preferred modulator may be designed for a specific bandwidth within the Ka-band, e.g., 25.5 to 27 GHz, the center frequency is easily modified throughout the full Ka-band range by adjusting printed RF microstrip components. Similarly, a preferred modulator can accommodate any selected data rate from DC to 800 Msps by selecting spectral filter components. Thus, the preferred modulator has application to any high data rate space or military application.

Advantageously, a preferred Ka-band transmitter provides a minimum bandwidth (null-to-null) of 400 MHz for a 300 Msps modulated signal; the bandwidth is scaled to the data rate requirement. The LO driver operates at one quarter the output center frequency, simplifying on phase-locked oscillator requirement. The LVDS receives I and Q data streams, up to 400 Msps each, for a maximum composite data rate of 800 Msps. The preferred even harmonic vector modulator provides excellent carrier suppression and error vector magnitude performance. Mechanical tuning allows quick in-circuit tuning for optimization and increasing yield while maintaining immunity to environment. Further, the preferred Ka-band modulator exhibits low error vector magnitude (EVM) for reduced transmitter implementation loss, thereby increasing the overall communication link margin. The radiation-hardened high-rate driver allows pre-modulation filtering of the incoming data to exceed spectral shaping requirements without the use of lossy output filters. Thus, the module provides a Ka-band communications downlink to continuously transmit tip to 800 Msps of data, e.g., scientific instrument data, to a ground system or another satellite. The preferred 3D RF module provides a compact mechanical design with the back-to-back cavity enclosure tightly coupling integral module components, e.g., through direct die attach, substrate attach, wirebonding, and conventional surface mount technologies.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A Ka-band transmitter comprising:
   a self-contained module;
   a radio frequency (RF) channel contained within said module;
   an RF signal path in said RF channel;
   a phase lock oscillator at one end of said RF channel, said phase lock oscillator having a fundamental frequency;
   an In-phase data (I-data) signal segment;
   a Quadrature data (Q-data) signal segment;
   a pair of low pass filters, each connected to an output of one of said I-data signal segment and said Q-data signal segment;
   a Quadriphase Shift Keying (QPSK) vector modulator having a first input connected to an output of said phase lock oscillator and a pair of inputs connected to said pair of low pass filters, said pair of low pass filters being between said I-data signal segment and Q-data signal segment and said QPSK vector modulator; and
   a driver connected to an output of said QPSK vector modulator, wherein said phase lock oscillator, said I-data signal segment, said Q-data signal segment, said QPSK vector modulator and said driver are contained within said self-contained module; wherein said RF signal path comprises a printed RF microstrip and defines said QPSK vector modulator and said driver; said RF microstrip comprises a collection of alumina printed circuit boards bonded to the floor of said RF channel; and said driver is a distributed Monolithic Microwave Integrated Circuit (MMIC) amplifier subassembly bonded to a copper molybdenum (CuMo) carrier and wirebonded to alumina substrates in the RF channel.

2. A Ka-band transmitter as in claim 1, wherein said self-contained module comprises:
an RF lid;
a main enclosure, said RF channel being defined in said main enclosure, said RF channel being completely enclosed with said RF lid in place;
a printed circuit board contained within said main enclosure, said pair of low pass filters, said I-data signal segment and said Q-data signal segment on said printed circuit board; and
a base plate, said printed circuit board enclosed in said main enclosure with said base plate in place.

3. A Ka-band transmitter as in claim 1, wherein said phase lock oscillator is in a cavity in said main enclosure, said phase lock oscillator being completely enclosed with said RF lid in place.

4. A Ka-band transmitter as in claim 1, wherein said QPSK vector modulator is an in-line even-harmonic modulator comprising:
an input splitter/combiner;
a phase shifter;
a pair of mixers connected to a respective one of said pair of low pass filters, a first output of said input splitter/combiner connected to an input to said phase shifter, a second output of said input splitter/combiner connected to an input of one of said pair of mixers, an output of said phase shifter being an input to the other of said pair of mixers;
a pair of band pass filters, an RF output of each of said pair of mixers being an input to a respective one of said pair of band pass filters; and
an output splitter/combiner, each of said pair of band pass filters being connected to an input to said output splitter/combiner.

5. A Ka-band transmitter as in claim 4, wherein said input splitter/combiner is a two-section Wilkinson with embedded resistors, said phase shifter is a λ/4 delay line, said pair of mixers are antiparallel diode even-harmonic mixers, and said pair of band pass filters are 3-section hairpin in microstrip with resonators folded in passing a fourth harmonic of said fundamental frequency.

6. A Ka-band transmitter as in claim 5, wherein a distributed amplifier connects said phase lock oscillator to said QPSK vector modulator and said fundamental frequency is 6.625 Gigahertz (6.625 GHz).

7. A Ka-band transmitter as in claim 4, wherein said QPSK vector modulator is tunable and further includes tuning points in each path between said input splitter/combiner and said output splitter/combiner.

8. A Ka-band modulator as in claim 1, wherein each of said I-data signal segment and Q-data signal segment comprises:
a low voltage differential signaling (LVDS) receiver;
a differential amplifier; and
an adjustable bias connected to one input of said differential amplifier.

9. A Ka-band modulator comprising:
a self-contained module;
a radio frequency (RF) channel contained within said module;
an RF signal path in said RF channel;
a phase lock oscillator at one end of said RF channel providing a fundamental frequency (LO);
a distributed amplifier receiving said fundamental frequency and driving said LO at said fundamental frequency;
a pair of signal segments receiving In-phase data (I-data) and Quadrature data (Q-data) difference signals and providing single-ended I-data and Q-data signals;
a pair of low pass filters filtering said single-ended I-data and Q-data signals;
a Quadriphase Shift Keying (QPSK) vector modulator receiving said fundamental frequency (LO) and said single-ended I-data and Q-data signals and providing a modulated Ka-band signal; and
a driver receiving said Ka-band data signal and amplifying the QPSK vector modulator RF load responsive to said Ka-band data signal;
wherein said self-contained module comprises:
an RF lid;
a main enclosure, a cavity and said RF channel being defined in said main enclosure, said phase lock oscillator disposed in said cavity, said phase lock oscillator and said RF channel being completely enclosed with said RF lid in place;
a printed circuit board contained within said main enclosure, said pair of low pass filters, said I-data signal segment and said Q-data signal segment on said printed circuit board;
feedthrus connecting circuits on said printed circuit board to said RF signal path; and
a base plate, said printed circuit board enclosed in said main enclosure with said base plate in place.

10. A Ka-band modulator as in claim 9, wherein power supply circuitry for said self-contained module is attached to said baseplate.

11. A Ka-band modulator as in claim 9, wherein said RF signal path comprises a printed RF microstrip and Monolithic Microwave Integrated Circuit (MMIC) subassemblies and defines said QPSK vector modulator and said driver.

12. A Ka-band modulator as in claim 11, wherein said RF microstrip comprises a collection of alumina printed circuit boards bonded to the floor of said RF channel and said driver includes a distributed amplifier MMIC subassembly bonded to the RF channel floor and wirebonded to traces on the alumina substrates.

13. A Ka-band modulator as in claim 11, wherein said QPSK vector modulator is an in-line even-harmonic modulator comprising:
an input splitter/combiner receiving said fundamental frequency;
first tuning points in each output path of said input splitter/combiner;
a phase shifter in one output path receiving said fundamental frequency, said first tuning points in said one output path being between said phase shifter and said input splitter/combiner;
a pair of mixers connected to a respective one of said pair of low pass filters, a second output path being an input of one of said pair of mixers, said first tuning points in said second output path being between said one of said pair of mixers and said input splitter/combiner, an output of said phase shifter being an input to the other of said pair of mixers;

second tuning points in each RF output path of said pair of mixers;

a pair of band pass filters in said each RF output path, said second tuning points being between each of said pair of mixers and a respective one of pair of band pass filters; and an output splitter/combiner, each input of said output splitter/combiner connected to one of said pair of band pass filters.

14. A Ka-band modulator as in claim 13, wherein said input splitter/combiner is a two-section Wilkinson with embedded resistors, said phase shifter is a λ/4 delay line, said pair of mixers are antiparallel diode even-harmonic mixers, and said pair of bandpass filters are 3-section hairpin in microstrip with resonators folded in passing a fourth harmonic of said fundamental frequency; and said tuning points are pairs of screws in the RF cavity through the RF lid and spaced apart by an odd multiple of the signal half wavelength.

15. A Ka-band modulator as in claim 9, wherein each of said I-data signal segment and Q-data signal segment comprises:

a low voltage differential signaling (LVDS) receiver, a differential amplifier; and an adjustable bias connected to one input of said differential amplifier.

16. A Ka-band modulator as in claim 9, wherein said fundamental frequency is 6.625 Gigahertz (6.625 GHz) (¼ the RF output center frequency) and said low-pass filters are diplexors and include a high-pass filter shunting high frequency signals rejected by the low pass filters.

* * * * *